(12) United States Patent
Wu et al.

(10) Patent No.: US 8,514,566 B2
(45) Date of Patent: Aug. 20, 2013

(54) DISK DRIVE ASSEMBLY

(75) Inventors: Chia-Kang Wu, New Taipei (TW);
Li-Ping Chen, New Taipei (TW);
Yao-Chung Chen, New Taipei (TW);
Chieh-Chen Chen, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 108 days.

(21) Appl. No.: 13/327,427

(22) Filed: Dec. 15, 2011

(65) Prior Publication Data

US 2012/0327585 A1  Dec. 27, 2012

(51) Int. Cl.
*G06F 1/16* (2006.01)

(52) U.S. Cl.
USPC .................. 361/679.33; 360/265.1; 174/255; 248/282.1

(58) Field of Classification Search
USPC ............. 312/319.2, 223.1, 223.2, 244, 270.2;
248/213.2, 220.21, 124.1, 309.1, 220.22,
248/694, 71, 639, 282.1; 439/660, 352, 541.5,
439/492, 67, 135; 174/254, 520, 261, 387,
174/252, 255, 15.2; 369/75.1, 258.1, 30.01;
360/234, 99.08, 135, 110, 97.21, 97.12, 86,
360/236.6, 97.16, 137, 265.1; 361/679.33,
361/361/679.34, 679.55, 679.27, 679.31,
361/679.26, 679.01, 679.52, 679.08, 679.48,
361/679.58, 679.39
See application file for complete search history.

(56) References Cited

U.S. PATENT DOCUMENTS

| 2010/0172087 A1* | 7/2010 | Jeffery et al. | 361/679.33 |
| 2011/0069442 A1* | 3/2011 | Chen et al. | 361/679.33 |
| 2011/0122568 A1* | 5/2011 | Hsieh et al. | 361/679.34 |

* cited by examiner

*Primary Examiner* — Hung Duong
(74) *Attorney, Agent, or Firm* — Altis Law Group, Inc.

(57) ABSTRACT

A disk drive assembly includes an enclosure, a printed circuit board (PCB), a back board, a drive bracket, a first disk drive, and a second disk drive. The enclosure includes a bottom wall. The PCB is mounted on the bottom wall and parallel to the bottom wall. The back board is connected to and parallel to the PCB. The drive bracket includes a first side panel, a second side panel, and a third side panel parallel to each other. The first disk drive is mounted between the first side panel and the second side panel. The first disk drive is electrically connected to and perpendicular to the back board. The second disk drive is mounted between the second side panel and the third side panel. The second disk drive is electrically connected to and perpendicular to the back board.

16 Claims, 4 Drawing Sheets

DISK DRIVE ASSEMBLY

BACKGROUND

1. Technical Field

The disclosure generally relates to a disk drive assembly of a server.

2. Description of Related Art

A number of disk drives are usually exposed from the front panel of a server. However, the area of the front panel is limit, and cannot hold too many disk drives.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
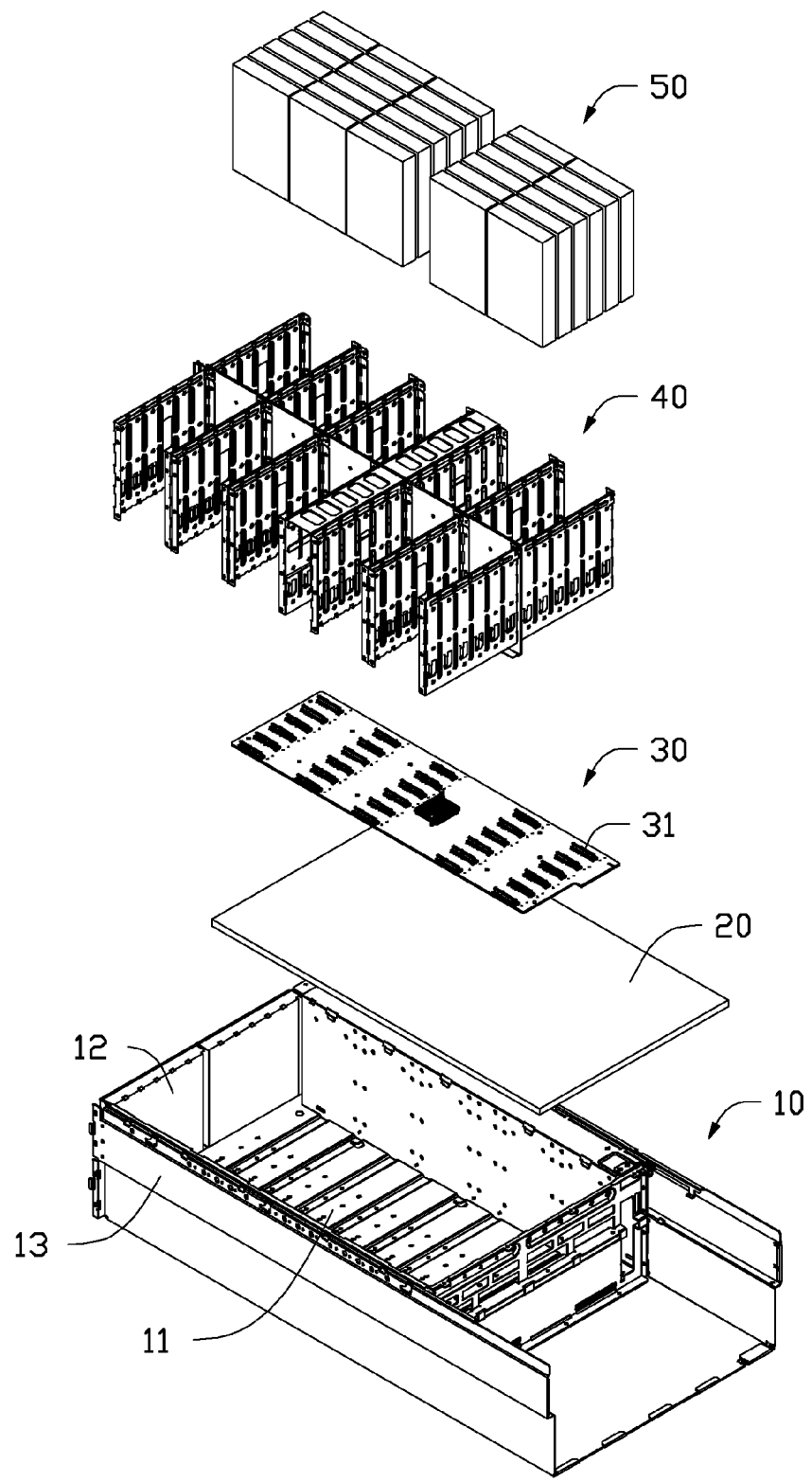
FIG. 1 is an exploded, isometric view of an embodiment of a disk drive assembly.
Figure 2:
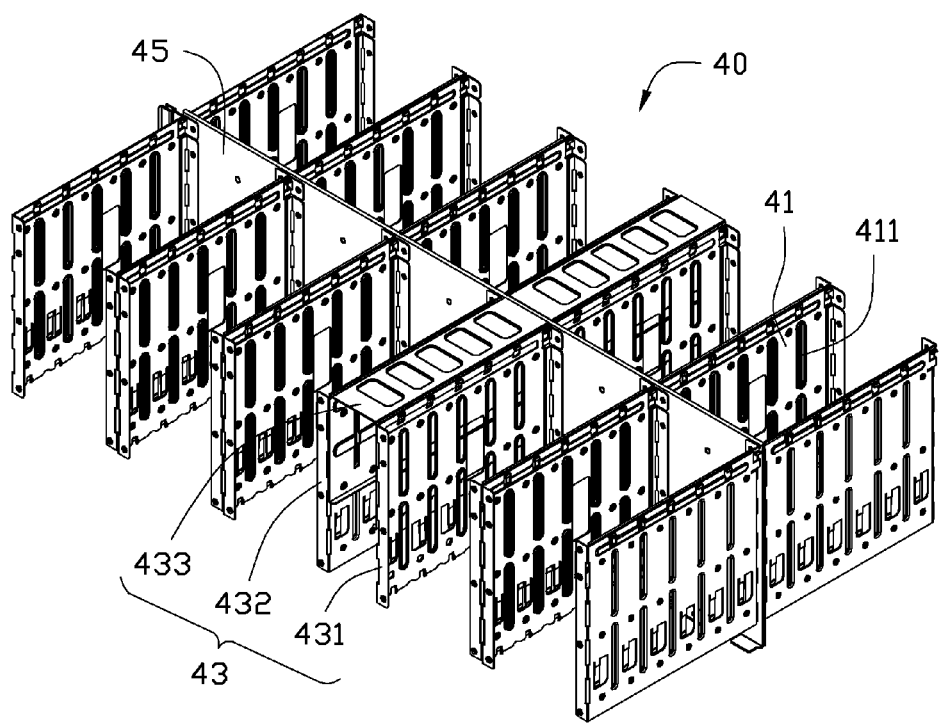
FIG. 2 is an isometric view of a drive bracket of FIG. 1.

Referring to FIGS. 1 and 2, one embodiment of a disk drive assembly is shown. The disk drive assembly includes an enclosure 10, a printed circuit board 20, a back board 30, a drive bracket 40, and a plurality of disk drives 50.

The enclosure 10 includes a bottom wall 11, two first side walls 12, and two second side walls 13. The two first side walls 12 are substantially parallel to each other and substantially perpendicular to the bottom wall 11. The two second side walls 13 are substantially parallel to each other and substantially perpendicular to the bottom wall 11. The second side wall 13 is substantially perpendicular to the first side wall 12.

The printed circuit board 20 is mounted on the bottom wall 11 and substantially parallel to the bottom wall 11. The printed circuit board 20 includes a Central processing unit (CPU) (not shown).

The back board 30 is electrically connected to the printed circuit board 20. The back board 30 defines a plurality of inserting slots 31 corresponding to the disk drives 50.

The drive bracket 40 includes five side panels 41, a mounting portion 43, an isolating panel 45. The mounting portion 43 includes a first mounting panel 431, a second mounting panel 432 substantially parallel to the first mounting panel 431, and a connecting panel 433 connected between the first mounting panel 431 and the second mounting panel 432. Each side panel 41 includes a plurality of guiding portions 411. Each guiding portion 411 extends substantially perpendicular to the back board 30.

The structures of the first mounting panel 431 and the second mounting panel 432 are similar to the structure of the side panel 41. The first mounting panel 431 is substantially parallel to the side panel 41. Some of the disk drives 50 are mounted between the first mounting panel 431 and the side panel 41 adjacent to the first mounting panel 431. Some of the disk drives 50 are mounted between the second mounting panel 432 and the side panel 41 adjacent to the second mounting panel 432. Some of the disk drives 50 are mounted between the two adjacent side panels 41. The side panels 41 are substantially perpendicular to the second side wall 13. The length of the side panel 41 is substantially equal to the distance between the two second side wall 13.

Figure 3:
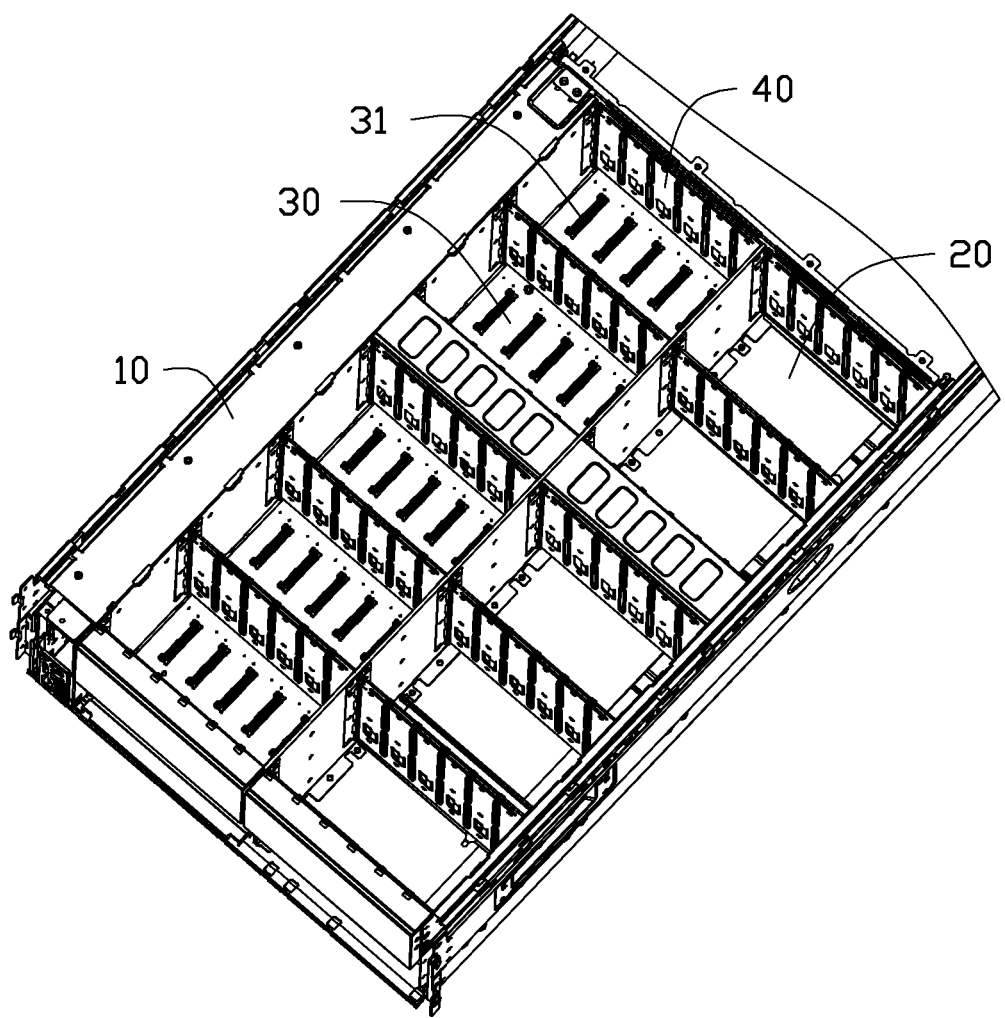
FIG. 3 is an assembled view of a drive bracket, a printed circuit board, a back board, and an enclosure of FIG. 1.
Figure 4:
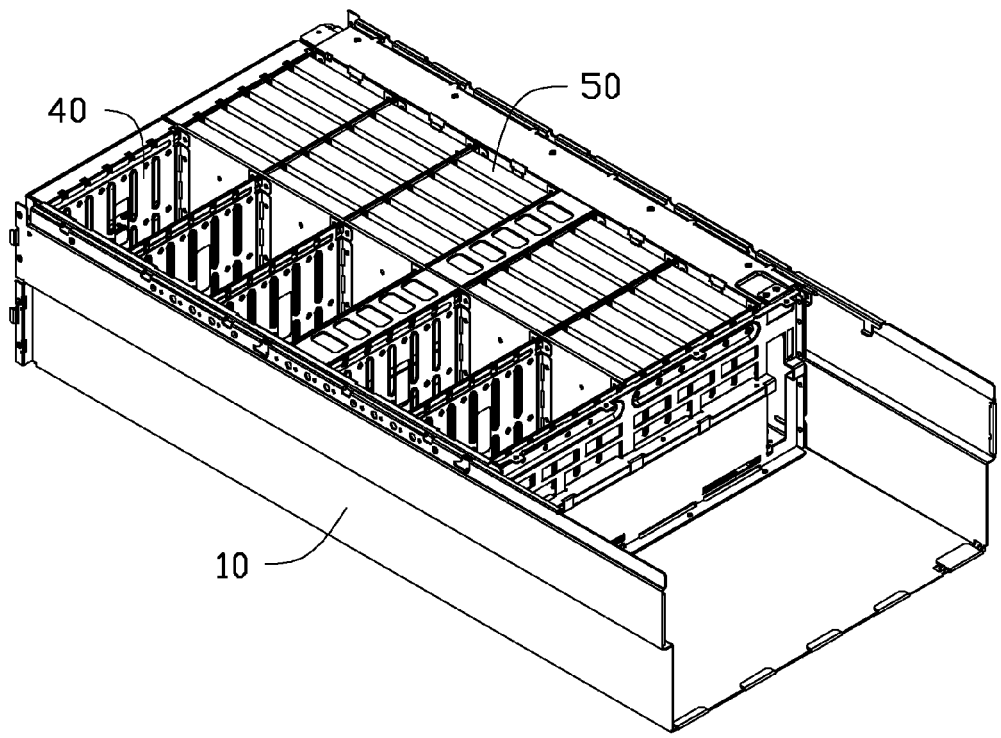
FIG. 4 is an assembled view of FIG. 1.

Referring to FIGS. 3 and 4, in assembly, the printed circuit board 20 is mounted on the bottom wall 11 of the enclosure 10. The back board 30 is electrically connected to the printed circuit board 20. The back board 30 is substantially parallel to the printed circuit board 20. The drive bracket 40 is mounted in the enclosure 10 to enable one side panel 41 of the drive bracket 40 to contact the first side wall 12. Some of the disk drives 50 are mounted between the second mounting panel 432 and the side panel 41 adjacent to the second mounting panel 432. Some of the disk drives 50 are mounted between the two adjacent side panels 41. The disk drives 50 slide into the drive bracket 40 via the guiding portions 411 substantially perpendicular to the back board 30 and perpendicular to the side panel 41.

It is to be understood, however, that even though numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A disk drive assembly comprising:
   an enclosure, the enclosure comprising a bottom wall;
   a printed circuit board, the printed circuit board mounted on the bottom wall and substantially parallel to the bottom wall;
   a back board, the back board electrically connected to the printed circuit board and substantially parallel to the printed circuit board;
   a drive bracket, the drive bracket comprising a first side panel, a second side panel, and a third side panel parallel to each other;
   a first disk drive, the first disk drive mounted between the first side panel and the second side panel, the first disk drive being electrically connected to and substantially perpendicular to the back board; and
   a second disk drive, the second disk drive mounted between the second side panel and the third side panel, the second disk drive being electrically connected to and substantially perpendicular to the back board.

2. The disk drive assembly of claim 1, wherein the first disk drive and the second disk drive are substantially perpendicular to the first side panel.

3. The disk drive assembly of claim 1, wherein the enclosure further comprises two first side walls perpendicularly extending from the bottom wall; the two first side walls are substantially parallel to each other; and the drive bracket contacts between the two first side walls.

4. The disk drive assembly of claim 3, wherein the enclosure further comprises two second side walls perpendicularly extending from the bottom wall; the two second side walls are substantially parallel to each other; the first side wall is substantially perpendicular to the second side wall; and the first side panel contacts between the two second side walls.

5. The disk drive assembly of claim 4, further comprising a third disk drive, wherein the drive bracket further comprises a mounting portion; the mounting portion comprises a first mounting panel substantially parallel to the first side panel, a second mounting panel substantially parallel to the first mounting panel, and a connecting panel connected between the first mounting panel and the second mounting panel; and the third disk drive mounted between the first mounting panel and the third side panel.

6. The disk drive assembly of claim 5, further comprising a fourth disk drive, wherein the drive bracket further comprises a fourth side panel substantially parallel to the first side panel; and the fourth disk drive is mounted between the fourth side panel and the second mounting panel.

7. The disk drive assembly of claim 1, wherein the back board defines two inserting slots electrically connected to the first disk drive and the second disk drive.

8. The disk drive assembly of claim 7, wherein the first side panel comprises a guiding portion for guiding the first disk drive to be inserted in the inserting slot, an extending direction of the guiding portion being substantially perpendicular to the back board.

9. A disk drive assembly comprising:
an enclosure, the enclosure comprising a bottom wall;
a printed circuit board, the printed circuit board mounted on the bottom wall;
a back board, the back board electrically connected to the printed circuit board and substantially parallel to the printed circuit board;
a drive bracket, the drive bracket comprising a first side panel, a second side panel, and a mounting portion connected between the first side panel and the second panel; the mounting portion comprising a first mounting panel facing the first side panel and substantially parallel to the first side panel, a second mounting panel facing the second side panel and substantially parallel to the second side panel, and a connecting panel connected between the first mounting panel and the second mounting panel;
a first disk drive, the first disk drive being mounted between the first side panel and the first mounting panel along a direction perpendicular to the bottom wall, the first disk drive being electrically connected to the back board; and
a second disk drive, the second disk drive being mounted between the second side panel and the second mounting panel, the second disk drive being electrically connected to the back board.

10. The disk drive assembly of claim 9, wherein the first disk drive and the second disk drive are substantially perpendicular to the first side panel.

11. The disk drive assembly of claim 9, wherein the enclosure further comprises two first side walls perpendicularly extending from the bottom wall; the two first side walls are substantially parallel to each other; and the drive bracket contacts between the two first side walls.

12. The disk drive assembly of claim 11, wherein the enclosure further comprises two second side walls perpendicularly extending from the bottom wall; the two second side walls are substantially parallel to each other; the first side wall is substantially perpendicular to the second side wall; and the first side panel contacts between the two second side walls.

13. The disk drive assembly of claim 9, wherein the first mounting panel is substantially parallel to the second mounting panel.

14. The disk drive assembly of claim 9, wherein the back board defines two inserting slots electrically connected to the first disk drive and the second disk drive.

15. The disk drive assembly of claim 14, wherein the first side panel comprises a guiding portion for guiding the first disk drive to be inserted in the inserting slot, an extending direction of the guiding portion being substantially perpendicular to the back board.

16. The disk drive assembly of claim 9, wherein the printed circuit board is substantially parallel to the bottom wall.

\* \* \* \* \*